Figure 1:
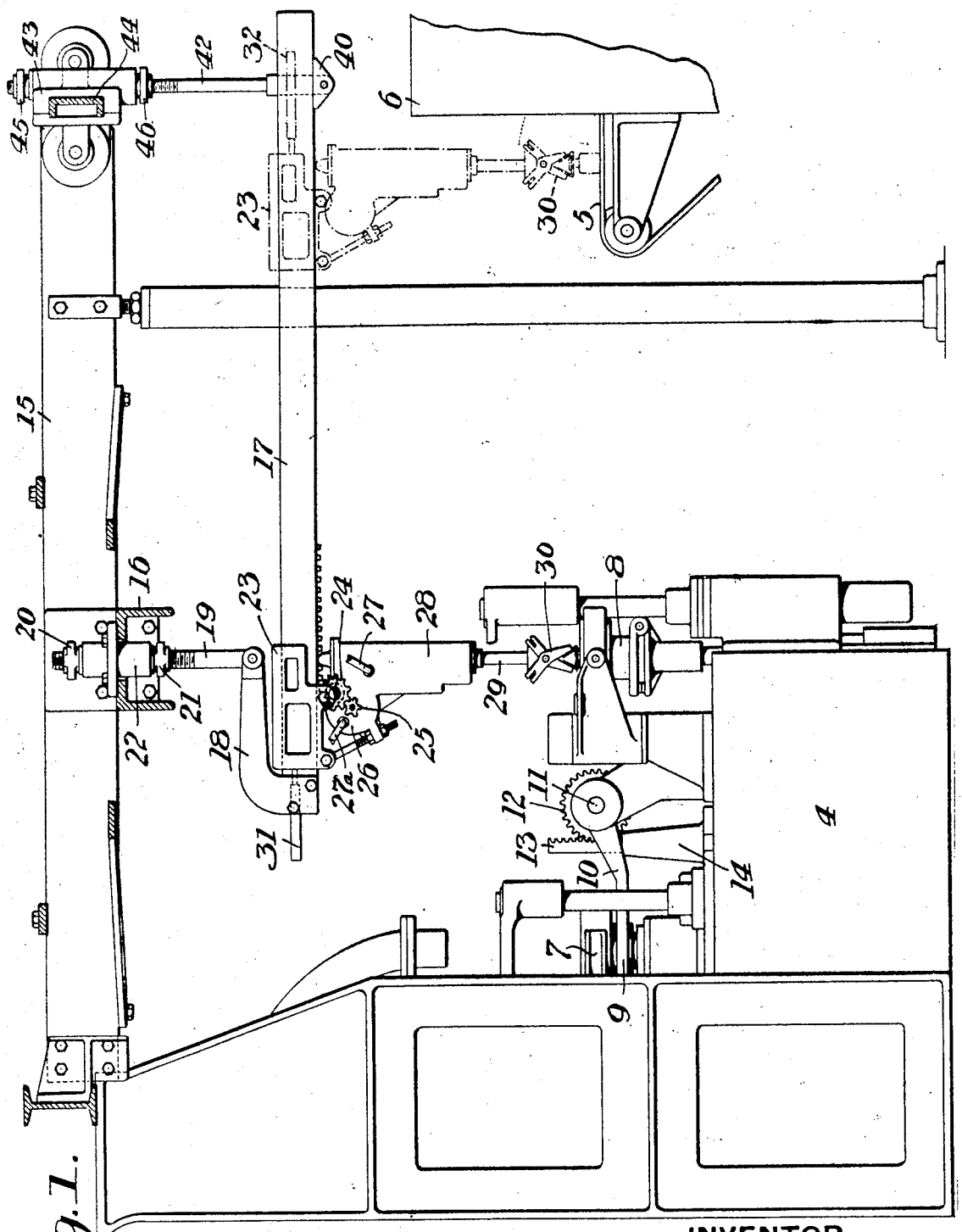

March 8, 1932.  H. W. INGLE  1,849,038
APPARATUS FOR STACKING GLASSWARE
Filed Nov. 1, 1926  2 Sheets-Sheet 1

INVENTOR
HENRY W. INGLE
By Robron S Brown
attorney

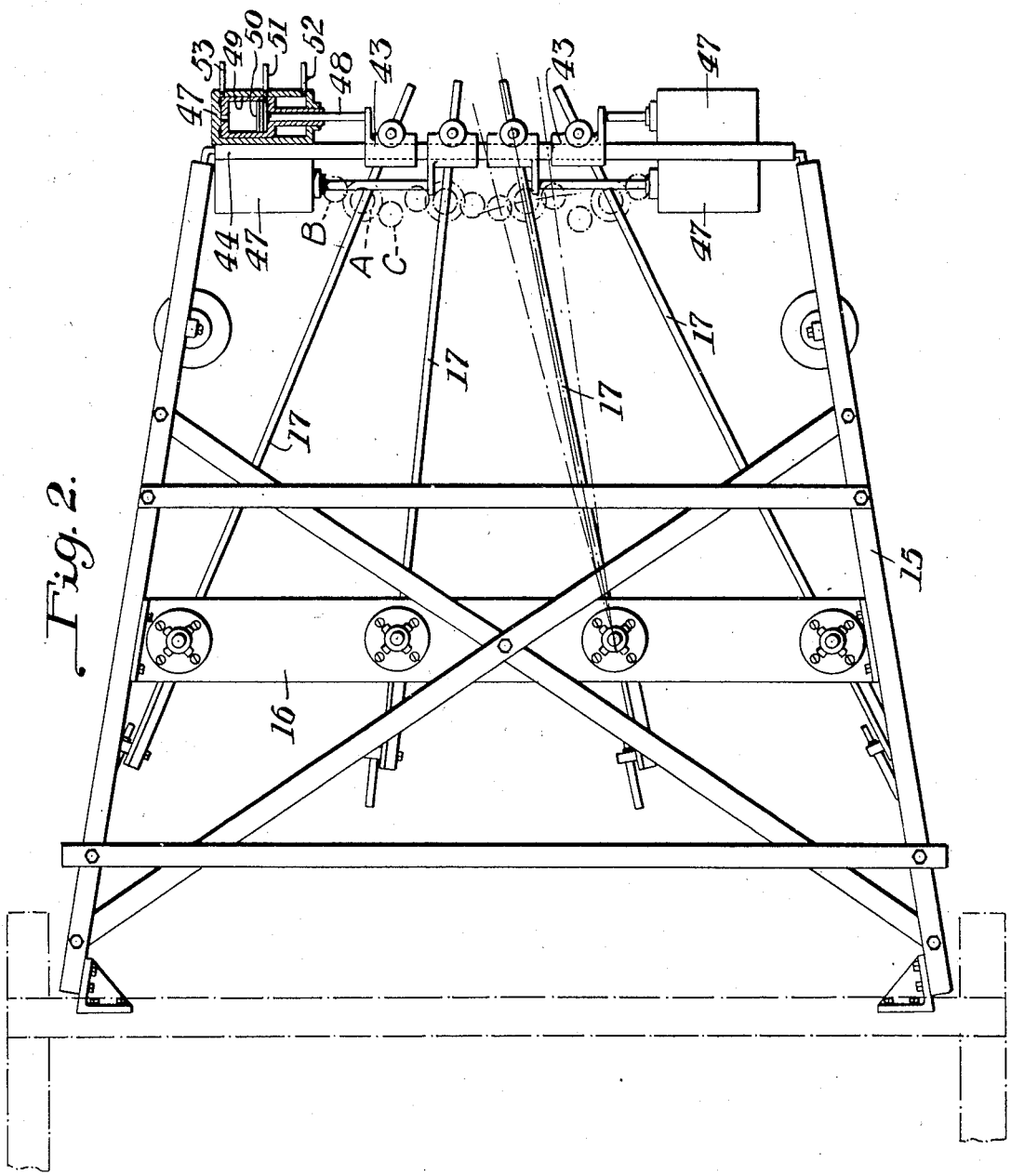

Patented Mar. 8, 1932

1,849,038

UNITED STATES PATENT OFFICE

HENRY W. INGLE, OF HARTFORD, CONNECTICUT, ASSIGNOR TO HARTFORD-EMPIRE COMPANY, OF HARTFORD, CONNECTICUT, A CORPORATION OF DELAWARE

APPARATUS FOR STACKING GLASSWARE

Application filed November 1, 1926. Serial No. 145,423.

My invention relates to apparatus for stacking glassware and is particularly suitable for transferring glassware from a wareforming machine to a lehr conveyer, but may, of course, be used in any relation where it is desired to transfer articles from one point to another in a particular manner. The invention is an improvement upon that described in my co-pending application, Serial No. 25,600, filed April 24, 1925, now Patent No. 1,733,987, granted October 29, 1929.

One object of the present invention is to provide means for transferring articles from each of a plurality of points to a single conveyer and to distribute the said articles upon the said conveyer in predetermined relative positions.

Another object of my invention is to provide an improved form of apparatus for distributing articles upon a receiving surface.

Still another object of my invention is to simplify and improve generally the structure and operation of transfer apparatus.

One form which my invention may take is shown in the accompanying drawings wherein Fig. 1 is a view, partially in side elevation and partially in section, of apparatus embodying my invention, and Fig. 2 is a plan view of a portion of the apparatus of Fig. 1.

For convenience of illustration, I have shown the apparatus as employed for transferring glassware from a glass-forming machine 4 to a conveyer belt 5 which carries the ware into a lehr 6. The glass-forming machine 4 may be of any type, but is shown as provided with a parison or blank mold 7 and a blow mold 8. The blanks are transferred from the blank mold to the blow mold by means of a neck ring 9 that is carried by an arm 10 which is mounted on a rock shaft 11. The rock shaft carries a pinion 12 that meshes with a rack 13 that is vertically movable in a guide 14, by any suitable means, to oscillate the neck ring 9 between the parison mold 7 and the blow mold 8, from which latter mold the completed article is removed by the apparatus which will now be described, and which, as shown, is adapted to operate with a forming machine composed of four mold sections of the type just described.

The transfer apparatus is shown as mounted upon a framework 15 that carries a cross beam 16 which supports the rear ends of a series of tracks or rack bars 17 through the medium of brackets 18. The brackets are rigidly secured to the bars 17 and have pivotal connection with eye-bolts 19. The eye-bolts 19 extend through the beam 16 and have vertical adjustment therein, through the medium of nuts 20 and 21 that abut against opposite ends of a sleeve 22 which is secured to the I-beam. The vertical adjustment of the bolts 19 permits positioning of the tracks 17 at various distances above the blow molds 8, to enable the transfer apparatus to handle ware of various sizes.

A carriage 23 is mounted for traveling movement longitudinally of each track 17 and carries a pinion 24 which meshes with a second pinion (not shown) meshing with the teeth on the under side of track 17. The pinion 24 is driven by a pinion 25 which is connected to a reversible motor (not shown), preferably of the fluid pressure type, disposed within a casing 26. The motor may be of the type shown in my patent above referred to, or of any suitable form. The fluid pressure for operating the motor may be delivered through flexible pipes 27 and 27a, from any convenient source. The casing 26 is provided with a cylindrical extension 28 (Fig. 1) that has a piston which is connected to a piston rod 29, for raising and lowering ware-engaging tongs 30, by means of fluid pressure. The tongs may be operated in various ways, such as shown in my said patent, for example.

Adjustable stops 31 and 32 are provided for limiting the movements of the carriage 23 and thus properly spotting the carriage at its take-out position above the blow mold and at its stacking position above the conveyer.

The outer end of each of the tracks 17 is slidably supported upon a block 40 which has pivotal connection with a hanger bolt 42. Each of the hanger bolts 42 is supported by a bracket 43 that is mounted upon a slide bar 44, for movement transversely of the frame 15. The rods 42 are adjustable in the brackets 43, by means of nuts 45 and 46 which have threaded engagement with the rods and abut against the upper and lower sides, respectively, of the bracket 43. This arrangement permits of the transfer apparatus being adjusted to various heights with respect to the lehr belt 5, so that ware of various sizes can be properly placed upon the belt 5.

In the operation of the apparatus, and starting with the carriage 23 in the position shown in Fig. 1, the tongs 30 are caused to grasp the neck of a completed bottle, whereupon air is supplied through the pipe 27, to actuate the motor and drive the pinion 25 in a counter-clockwise direction, which will cause the carriage 23 to travel toward the outer end of track 17 to the position indicated in dotted lines in Fig. 1. The tongs 30 are then operated to place the article upon the conveyer 5. Return movement of the carriage 23 may then be effected by admitting fluid pressure through the pipe 27a, to rotate the pinion 25 in a clockwise direction.

In order to shift the outer ends of the tracks 17 transversely of the conveyer 5 and thereby distribute articles across the width of the conveyer, I provide a series of fluid-pressure cylinders 47 each of which carries a piston rod 48 that is connected to one of the brackets 43. A hollow piston 49 is mounted in each cylinder 47 and serves as a cylinder for a piston 50 that is connected to the piston rod 48.

The uppermost arm 17 of Fig. 2 is shown in its mid position where it deposits a bottle at A. To effect outward movement of the track 17 and permit deposit of a bottle at B, fluid pressure is admitted through the pipe 51 to the rear side of the piston 50, to force the same forwardly of its cylinder 49, pressure being meanwhile maintained through a pipe 52 upon the rear side of the piston-cylinder 49. The air to the front of piston 50 exhausts through a pipe 53.

In order to return the track 17 to its other extreme position of movement, for the purpose of permitting deposit of a bottle at C, air pressure is maintained at 52, pipe 51 is opened to exhaust, and pressure is admitted through the pipe 53. Such operation will return the track 17 to point A. Fluid pressure at 52 is then cut off and the pipe opened to exhaust, whereupon the pressure being admitted through 53 will force both the pistons 49 and 50 to their extreme retracted positions, thereby moving the track 17 to unloading station C.

Each of the other tracks 17 may be manipulated in the same manner, either simultaneously or in any sequence that may be desired, thereby permitting the deposit of articles upon the conveyer in predetermined relative positions.

In shifting the tracks in unison, two or more of the cylinders 47 may be dispensed with, and the remaining cylinder or cylinders employed to operate all of the tracks, if suitable connections are provided between the tracks and the remaining cylinders.

I claim as my invention:

1. Apparatus for handling ware, comprising a track, a carrier for transferring ware from the rear end of said track to the forward end thereof, and means for shifting the forward end of the track laterally, comprising a cylinder, a piston, a piston rod connected to the track and to the piston, a second piston located within said cylinder and chambered to serve as a cylinder for the first named piston, and means for admitting fluid pressure to said pistons intermittently and successively to effect movement of said track to a plurality of stations at which ware may be deposited.

2. Ware-handling mechanism comprising a ware supporting member, a piston for moving said supporting member, a cylinder for said piston, means for admitting fluid pressure to said cylinder, to move the piston, a second cylinder containing the first named cylinder, and means for admitting fluid pressure to the second named cylinder for effecting movement of the said first named cylinder.

3. Ware-handling mechanism comprising a ware supporting member, a piston connected to said supporting member, a cylinder for said piston, a second cylinder containing the first named cylinder, means for admitting fluid pressure against opposite ends of the first named cylinder to effect movements thereof alternately in opposite directions, a fluid pressure inlet extending through the wall of the second named cylinder intermediate the ends thereof, and communicating with a port in one end of the first named cylinder to effect movement of the piston in one direction, the first named cylinder being provided with a port in one end thereof through which fluid pressure that is admitted to the second named cylinder may pass to effect movement of the piston in the other direction.

4. Ware-handling apparatus comprising a ware-supporting member, a piston connected to said member, and means for operating said piston, comprising a main cylinder having fluid pressure inlet ports at each end and at a point intermediate its ends, a second cylinder movable in said main cylinder by pressure admitted through said end ports alternately, the second named cylinder containing the piston and having ports at opposite sides of said piston which respectively have communication with said intermediate port and with one of the end ports.

5. The combination with a lehr, of a carriage, a track on which the carriage runs toward and from the lehr, a piston, a piston rod connected to the track and to the piston, a cylinder, a second piston located within said cylinder and chambered to serve as a cylinder for the first named piston, and means for admitting fluid pressure to opposite sides of said pistons successively to effect movement of said track to a plurality of positions at which the ware may be deposited.

6. Apparatus for handling ware, comprising a lehr, a plurality of ware receiving stations, a track running from each of the receiving stations to the lehr, and pivoted at the receiving stations, carriers on said tracks for transferring ware from the receiving stations along said tracks to the lehr, and means for shifting the forward ends of the tracks laterally.

7. Apparatus for handling ware, comprising a track, a carrier on said track for transferring ware from the rear end of said track to the forward end thereof, means for shifting the forward end of the track laterally about a pivot the axis of which runs through the rear end of the track, comprising a piston, a piston rod connected to the track and to the piston, a cylinder, a second piston located within said cylinder chambered to serve as a cylinder for the first named piston, and means for admitting fluid pressure to opposite sides of said pistons successively to effect movement of said track to a plurality of positions at which ware may be deposited.

8. Apparatus for handling ware, comprising a track, a carrier on said track for transferring ware from the rear end of said track to the forward end thereof, and means for automatically shifting the forward end of the track laterally through predetermined fixed distances, comprising a cylinder, a piston, a piston rod connected to the track and to the piston, and means for admitting fluid pressure to opposite sides of said piston to effect movement of said track through predetermined distances to at least three fixed positions at which ware may be deposited, the positioning of the track at said fixed positions being independent of an excessive duration of application of said fluid pressure.

9. Apparatus for handling ware comprising a track, a carrier on said track for transferring ware from a receiving position below one point on said track to the forward end of the track, means for pivoting the track at a point in vertical alignment with the receiving position, and fluid pressure means for automatically shifting the forward end of the track laterally to at least three predetermined fixed positions, the positioning of the track at any of said positions being independent of an excessive application of fluid pressure to the last named means.

10. The combination with a lehr, of a carriage, a track on which the carriage runs toward and from the lehr, a cylinder, a second cylinder located within the first cylinder and arranged to serve as a piston within the first cylinder, a piston within the second cylinder, a piston rod connected to the piston and to the track, and means for admitting fluid pressure to opposite sides of said piston and second cylinder successively to effect movement of said track to a plurality of positions at which the ware may be deposited.

Signed at Hartford, Conn., this 28th day of October, 1926.

HENRY W. INGLE.